July 12, 1949.                G. B. DOREY                2,476,086
                           ELECTRIC POWER PLANT
Filed May 4, 1946                                       3 Sheets-Sheet 1
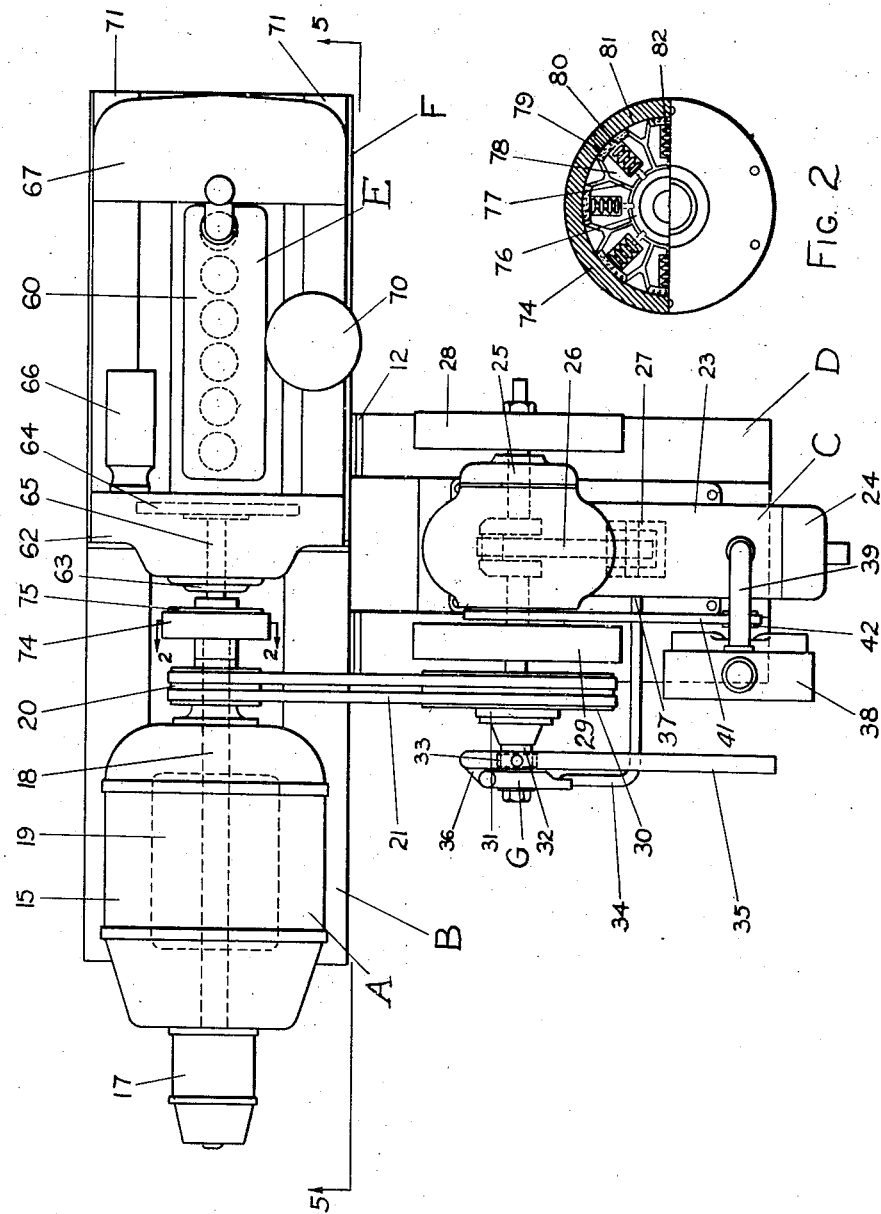
INVENTOR
George B. Dorey July 12, 1949.　　　　　G. B. DOREY　　　　　2,476,086
ELECTRIC POWER PLANT Filed May 4, 1946　　　　　　　　　　　　　　3 Sheets-Sheet 2

INVENTOR
George B. Dorey

July 12, 1949.   G. B. DOREY   2,476,086
ELECTRIC POWER PLANT
Filed May 4, 1946   3 Sheets-Sheet 3
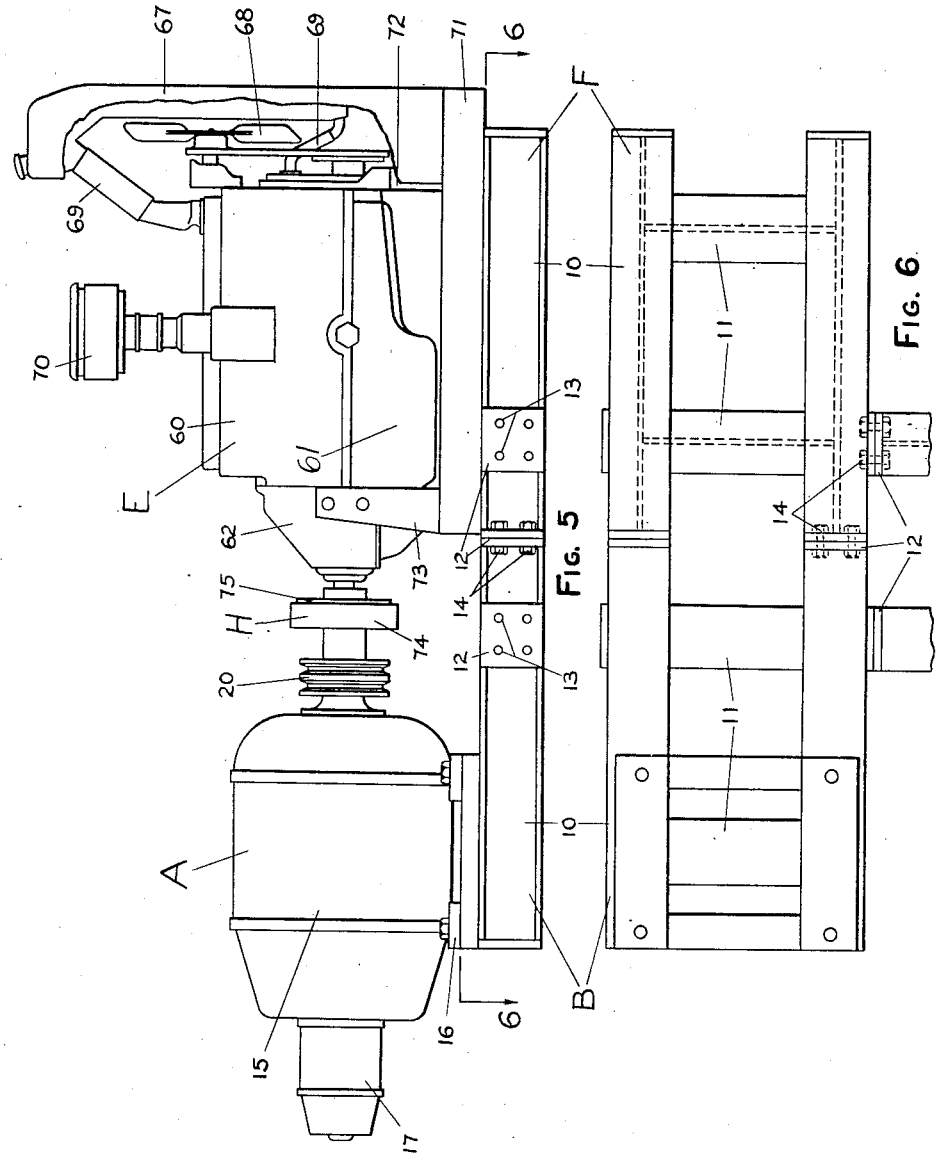
INVENTOR
George B. Dorey Patented July 12, 1949

2,476,086

UNITED STATES PATENT OFFICE 2,476,086

ELECTRIC POWER PLANT

George Binet Dorey, Westmount, Quebec, Canada, assignor to Mainguys Limited, Montreal, Quebec, Canada, a corporation of Canada Application May 4, 1946, Serial No. 667,330

5 Claims. (Cl. 290—4)

My invention relates to an improved electric power plant, and is particularly concerned with a type employing internal combustion engines as the prime movers.

An object of my invention is to provide a greater measure of dependability and flexibility of operation than has heretofore been attained with the existing types of plants, and to make more efficient utilization of the particular characteristics of different prime movers by applying them to the functions for which they are best suited. My improvements contemplate the employment of two independently operable engines in combination with a single generator, each engine differing from the other in its speed and power characteristics, whereby one engine may be used for a given duty and power output and the other engine called into operation when the power demands on the plant are best suited to its special characteristics.

It is a further object of my invention to incorporate in a power plant a powerful high speed engine and also a small heavy duty slow speed engine in connection with a single generator and to further utilize the high speed for starting the heavy duty engine.

My invention further resides in certain details of construction associated with the arrangement of the parts, the mounting of various components and their supporting bases as will be more fully pointed out and claimed.

The importance of my improvements and their place in the art may be best appreciated by a consideration of the limitations which exist in regard to efficient and economical operation of generating plants powered by means of internal combustion engines, especially under the circumstances of intermittent and varying power demands.

It is an established fact that a generating plant of the type above described when engineered to adequately meet maximum power demands will of necessity be overpowered under normal power demand requirements. The services for which most small generating plants are required are such as to present a wide spread between normal requirements and peak load demands, and in fact, such power consumers as hotels, farms, lumber camps, amusement centers, and rural communities often indicate normal requirements during periods of 20 hours per day which do not exceed 25% of the peak load demand.

It will, therefore, be apparent that in order to satisfy all requirements a plant must be sufficiently large to meet peak load demands, and this in turn involves, where a single prime mover is used, operation of the engine for protracted periods of time at partial efficiency. A low operating factor is not conducive to efficient operation of internal combustion engines, and consequently a system of using a number of smaller plants instead of one large one has come into general use. With this multiple plant system the units are arranged for independent operation and cut in as required in accordance with the power demands and then synchronized to function in parallel, but such an installation is not free from complications as it requires careful adjustment and close speed regulation of the various units involved, and also requires a large capital outlay.

My improved system overcomes the defects of the existing types of plants in that my invention provides a relatively small heavy duty slow speed engine having a power output designed to meet the requirements of normal operation and operatively connected with this engine is a high speed oversize generator. My system also provides for a high speed multiple cylinder engine for actuating the generator, instead of the small engine, whenever peak load conditions are indicated or whenever the demands on the system exceed the maximum power rating of the small engine. The use of a large oversize high speed generator in association with a relatively small slow speed heavy duty engine having a maximum power output below the maximum generator capacity is an outstanding feature of my invention. The comparatively large and heavy rotor of the oversize generator imparts a flywheel effect which materially assists in smoothing out undesirable pulsations associated with slow speed prime movers of the above mentioned type. It may be pointed out that in the conventional type of generator plant actuated by a single cylinder engine it is customary to supplement the flywheel effect of the engine by incorporating a flywheel on the generator shaft in order to mitigate undesirable pulsations. My system obviates the necessity of such an additional flywheel inasmuch as the weight of metal which would ordinarily be contained in a generator flywheel is now embodied in the rotor of the oversize generator and this extra weight becomes available to perform useful work in the form of momentary reserve generating capacity.

In order to make full use of the additional generating capacity furnished by the oversize generator I incorporate in the system a powerful multiple cylinder engine operating at rated generator speed and which is used to actuate the generator whenever the power demand exceeds the maximum power capacity of the small heavy duty slow speed engine.

The preferred arrangement for my system consists of a generator having a capacity approximately two to three times greater than the capacity of the slow speed engine, and the operating speed of the generator approximately double that of the said slow speed engine. The use of components on the basis of such proportions assures engine operation in its most efficient range. The high speed characteristic of the generator combined with the heavy flywheel effect of the large rotor effectively dissipates the undesirable engine pulsations which are an inherent feature of the single cylinder horizontal tye of engine. My improvements may therefore be considered as a reversal of the accepted practice of using a large engine and operating the same at partial efficiency in that I operate the engine at its best efficiency and the generator at partial efficiency. This is a highly desirable condition in that continuous operation at partial load and efficiency does not have the harmful effect upon electrical machinery that it does upon the engine or prime mover.

In carrying out my system a preferred arrangement consists of forming the structure in three complete components which may be readily assembled at the site as will hereinafter be fully pointed out.

From an economic point of view, both the capital investment and the overall operating cost are reduced through the efficient utilization of component characteristics achieved by my system.

For further comprehension of my invention reference may be had to the accompanying drawings wherein:

Fig. 1 is a plan view of my improved generating plant.

Fig. 2 is a vertical transverse sectional enlarged view of the centrifugal clutch as taken on a line 2—2 of Fig. 1.

Fig. 5 is a longitudinal elevational view of a portion of the plant as viewed on line 5—5 of Fig. 1.

Fig. 6 is a plan view of the base assembly as seen on line 6—6 of Fig. 5, said view indicating only a part of the transversely extending base.

Figure 3:
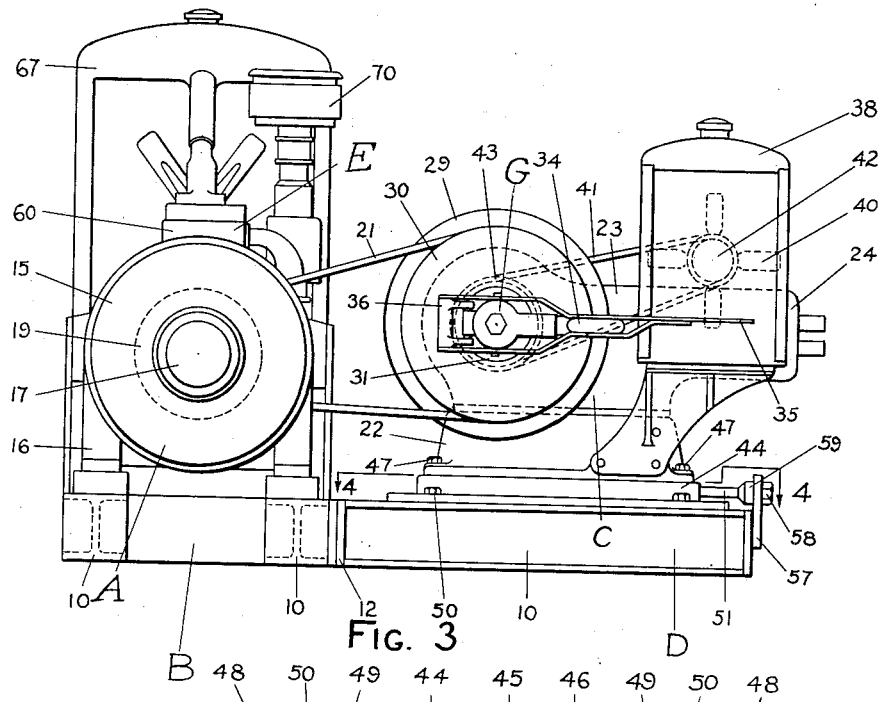
Fig. 3 is a vertical and elevation view of Fig. 1 as viewed from left to right.
Figure 4:
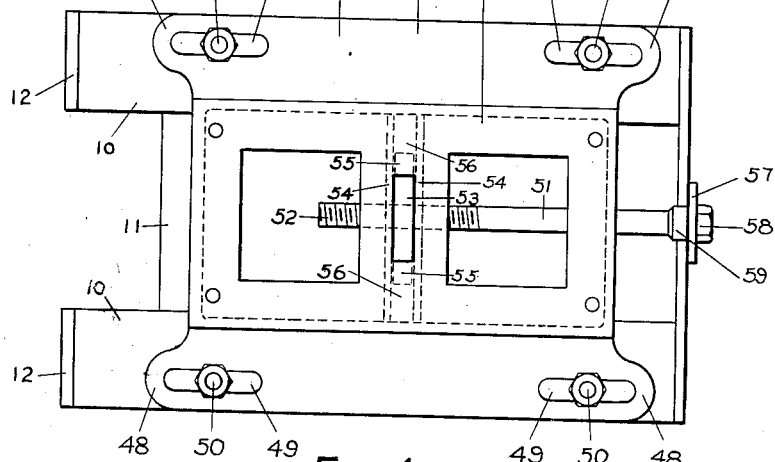
Fig. 4 is an enlarged plan view of the sliding carriage for the slow speed engine as viewed on a line 4—4 of Fig. 3.

In said drawings A indicates the generator, mounted on its foundation base B; C indicates a heavy duty slow speed engine mounted on its foundation base D; and E indicates a high speed multiple cylinder engine mounted on its foundation F.

The respective foundation bases B, D, and F are of similar construction and are preferably made of uniformly sized members thereby permitting ready manufacture in a common jig.

The said foundation bases are preferably formed of a pair of H beams 10—10 united by a pair of transversely extending similarly shaped beams 11—11, and the parts are welded into a unit construction. The various base units are provided with abutment plates 12 each having a plurality of holes 13 for the reception of bolts 14, whereby the various units may be brought into abutting relation as required and united together.

The three components A, C, and E are preferably arranged in such a manner that the slow speed type of engine C and its associated foundation base D extends transversely at right angles to the other two units and the whole arrangement when the parts are united presents a T shaped foundation which not only has the advantages of strength and rigidity, but also leaves both sides of the machinery open and accessible for servicing. The heavy duty engine which is preferably a Diesel engine of the horizontal type is shown as located substantially midway between the other two longitudinally disposed components and thus the base D attaches to both bases B and F and the arrangements further provide that anyone of the components may be removed or applied without disturbing the companion units.

In the operation of a heavy duty slow speed horizontal type of Diesel engine the unit has a creeping tendency brought about by the violence of the explosion which acts in horizontal direction and the positioning of the base D in abutting relation with the other units and connecting the various units together is of material advantage in obtaining a solid base.

The generator A is of the conventional type and instead of following the common practice of having a generator matched to the power rating of the operating Diesel engine I provide an appreciably oversize generator, which preferably is approximately between two and three times the maximum power capacity of the Diesel engine. Said generator A is indicated by a body portion 15, mounting feet 16, direct connected exciter 17, operating shaft 18, and rotor indicated conventionally at 19. Rigidly mounted on the generator shaft is a two grooved pulley 20 to receive V belts 21 for the purpose of connecting with the Diesel engine.

The Diesel engine C is of the heavy duty slow speed and preferably of the single cylinder horizontal type, and in practice I prefer a unit which will operate at a speed less than half the speed of the generator.

Said engine C is indicated on the drawings by a box-shaped base portion 22, cylinder body portion 23, cylinder head 24, crank shaft 25, connecting rod 26, piston 27, and mounted on the respective ends of the shaft 25 are fly wheels 28 and 29.

Projecting outwardly beyond flywheel 28 is a trunnion portion preformed to receive a starting handle (not shown) and adjacent the opposite flywheel 29 there is a two grooved V belt pulley 30 disposed in aligned relation with generator pulley 20 over which the belts 21 extend.

Pulley 30 is mounted to normally revolve freely on its axis whereby the generator may revolve independently of the engine and connection is effected between the pulley and engine through the medium of clutch mechanism G.

Said clutch mechanism G is of the conventional type and is indicated by a spider 31, operating cone 32, operating collar 33, fulcrum bracket 34, operating lever 35, and lever link 36. Said fulcrum bracket is mounted adjacent one end on the engine shaft and at its opposite end is anchored to engine cylinder body as at 37.

The engine C is preferably arranged in power unit form with cooling system including radiator 38, water hose connection 39 and cooling fan 40.

The fan is operated by means of belt 41 and associated pulleys 42 and 43.

Adjustment of tension of belt 21 is effected through lengthwise movement of the engine and to this end the engine C is mounted on a sliding carriage 44, mounted directly on the foundation base D.

Said carriage is provided with a body portion 45 having a seating surface 46 on which the engine rests and is anchored thereto by bolts 47. Extending laterally from the sides of the body portion are flange portions 48—48 each having slots 49—49 through which holding down bolts 50 extend and whereby the carriage with its associated engine is firmly held in place on its foundation base.

Lengthwise movement of the carriage is effected by a takeup mechanism including adjusting bolt 51 having a threaded portion 52 cooperating with a threaded nut 53, the latter held in place on the carriage by walls 54—54, and maintained against turning movement by having its ends 55 seating against the top walls 56 of the carriage.

The shaft is restrained against lengthwise movement by a plate 57 rigidly mounted on the base, said plate is interposed between the bolt head 58 and a collar 59, the latter being welded in place or otherwise rigidly secured to the bolt.

The component including engine E with its associated base F is mounted in longitudinal alignment with the generator component and includes a powerful multiple cylinder high speed engine which is preferably arranged to operate at 1800 revolutions per minute in the case of an alternating current generator drive. This engine has sufficient power to operate the generator at full efficiency independently of the slow speed engine.

The engine E when at rest is normally disconnected from the generator and a preferred form of connection between the generator and engine is a conventional type of clutch H operated by centrifugal action consequent on the operation of the engine. The high speed direct connected engine E is preferably arranged in complete power unit form and indicated by cylinder body portion 60, oil pan 61, flywheel housing 62, end bearing 63, flywheel 64, stub shaft 65, electrically operated starter 66, cooling radiator 67, cooling fan 68, hose connections for cooling system 69, angle shaped air cleaner 70, mounting members 71—71, and mounting brackets 72 and 73.

The centrifugal clutch H includes a drum part 74 non rotatably mounted on the generator shaft and centrifugal mechanism 75 rotatable with the engine shaft 65. Said centrifugal mechanism includes a spider 76 fixedly mounted on the shaft and formed with a plurality of radially extending walls 77 between which are disposed loosely mounted weighted friction elements 78. Each said element 78 is provided on its outer peripheral edge with a concentrically curved surface 79 fitted with a section of flexible brake band material 80 arranged to engage with the inner surface 81 of the drum 74, when the engine is rotated sufficiently fast to throw the weights outwards by centrifugal force, as will be understood. Coacting with each weighted element 78 is a spring 82 for retaining said weight in retracted position. When the engine is at rest the weights are not in contact with the drum 74 and there is therefore no operative connection between the engine and the generator.

Upon rotation of the engine the weighted elements 78 are thrown outwardly by centrifugal force and the frictional adherence between brake bands 80 and the inner concentric surface 79 of the drum member 74 causes the engine to pick up the load of the generator and thereafter both members function in unison so long as speed of rotation is maintained. The size and weights of the parts and tension of the springs are arranged to maintain proper contact at the full load rating and speed of the generator. When the engine is rotating at low speed there is a tendency for slippage to take place between the parts of the centrifugal coupling and I utilize this condition for the purpose of starting the heavy duty slow speed Diesel through the medium of the multiple cylinder engine as follows.

Assuming that the Diesel engine is disconnected by means of the clutch mechanism from the pulley 30, the engine E is placed in operation at a slow speed or at a speed just sufficient to pick up and lightly engage the coupling member of the generator which in turn rotates the pulley 30, whereupon the operator by means of the lever 35 engages the clutch thereby turning the Diesel engine crankshaft until such time as the Diesel engine is started and operates under its own power.

After the slow speed engine has been started, the connection between the two engines is broken by releasing the clutch and the slow speed engine permitted to run freely until operating speed has been attained. Multiple cylinder engine E is then shut down and engagement between the generator and slow speed engine is again effected by means of the clutch.

It has already been pointed out that the rated capacity of the generator exceeds that of the small Diesel engine and should a condition arise where the power demands are in excess of the available maximum horsepower of the small engine, said Diesel engine is disconnected or shut down and supplanted by means of the high speed engine which thereupon takes up the entire load; it being understood that the maximum power capacity of the high speed engine is sufficient to operate the generator at full load.

The increased capital cost involved by the use of a high speed multi cylinder engine is not of great importance because the particular type of engine employed may be a standard automotive gasoline engine, which is a mass production item and service and parts are cheap and available in most localities.

It will be appreciated that the cost of operation of a multiple cylinder engine as proposed will be in excess of that incurred by the slow speed Diesel engine, but in view of the fact that the high speed engine is only called upon in the nature of a standby unit, or for taking care of large loads for comparatively short periods this extra cost is not a material factor in the overall operating cost.

It will be noted that the high speed engine is mounted on a unit foundation subbase similar to that used in connection with the generator and the foundation base for the slow speed engine is also of similar form, all the bases being provided with abutting and connecting plates 11. My improved construction contemplates the use of standardized fabricated foundation subbases of uniform size and length which may be used with either of the three components involved and as it is a part of my operating plan that the generator may function with either one of the engines, it is highly desirable that either one of the engine components be easily assembled or disassembled from the system as may be required without affecting the mounting and operation of the other.

The particular connecting means employed for coupling the generator with the engines facilitate the ready removal or application of one or the other engines from the system. In the case of the slow speed belted engine, the only connection is by the pair of belts and the release of the coupling connection or vice versa merely involves an alteration in the belt tension. The take up mechanism included in the system provides an extremely simple means of varying the belt tension. In the case of the axially aligned components, the engine when at rest being completely disconnected from the generator may be readily moved in an endwise direction.

The arrangement of unit bases for each component is of special advantage in instances where shipment to remote areas is contemplated as individual parts may be readily handled by air transport.

While I have shown a definite embodiment of my invention it is understood that the same may be modified in various ways without departing from the fundamental principles involved.

What I claim is:

1. In a generating plant, the combination with a generator and two engines for operating the same, said generator and said engines being each mounted on a unit subbase, said subbases being provided with connecting plates having abutting surfaces whereby the respective components may be placed in abutting relation and united together, two of said components being placed end to end in longitudinally aligned relation and the other extending at right angles to the first two and having its ends abutting the sides of the two other bases and united therewith.

2. In a generating plant including a generator and two engines for independently operating the generator, the said generator and engines being each mounted on a unit foundation subbase; one of the said engines being disposed in axial alignment with the generator and the other of said engines extending substantially at right angles to the axis of the axially aligned generator and engine, said respective foundation bases when the engines are in operative relation being provided with abutments having attaching means associated therewith whereby the various bases are placed in abutting relation and united together into a common base structure.

3. In a generating plant the combination with a generator and two engines for independently operating the same; of a foundation base on which said generator and engines are mounted, said subbase being formed in the shape of a T with two bases disposed in aligned relation and united together and the third base extending at an angle to the aligned bases and united therewith.

4. In a generating plant composed of three major components including a generator and two prime movers for operating the generator; means for operatively connecting said generator with each prime mover; one of said means including a direct drive between the prime mover and generator; and the other of said means including a belted connection between the generator and prime mover; each said component being mounted on a unit base, each said base having abutting and connecting means whereby the respective bases when in operative relation are placed in abutting relation and united together; said base of the direct drive prime mover being disposed in alignment with the base of the generator component and the base of the belted prime mover extending at an angle to the aligned bases.

5. In a generating plant composed of three major components including a generator and two prime movers for operating the generator; one of said prime movers being axially aligned with the generator and the other of said prime movers being located at the side of the generator and a belted connection included between said last named prime mover and generator; a foundation base on which said axially aligned prime mover and generator are mounted; and a foundation base on which the belted prime mover is mounted, said respective foundation bases having abutting and connecting means whereby the respective bases are placed in abutting relation and united together.

GEORGE BINET DOREY.

REFERENCES CITED

The following references are of record in the file of this patent:

UNITED STATES PATENTS

| Number | Name | Date |
| --- | --- | --- |
| 779,054 | Shaw | Jan. 3, 1905 |
| 996,334 | Haskins | June 27, 1911 |
| 1,021,754 | Wilkinson | Mar. 26, 1912 |
| 1,117,378 | Heany | Nov. 27, 1914 |
| 1,176,309 | Muller | Mar. 21, 1916 |
| 1,703,064 | Griffiths | Feb. 19, 1929 |
| 1,774,492 | Thorne | Aug. 26, 1930 |
| 2,119,156 | Finnegan et al. | May 31, 1938 |

FOREIGN PATENTS

| Number | Country | Date |
| --- | --- | --- |
| 6,098 | (British) | Nov. 11, 1915 |
| 296,330 | (British) | Aug. 28, 1928 |